B. B. LEUSTIG.
LIFE PRESERVING APPARATUS FOR AEROPLANES.
APPLICATION FILED OCT. 31, 1918.
1,317,511.
Patented Sept. 30, 1919.
2 SHEETS—SHEET 1.
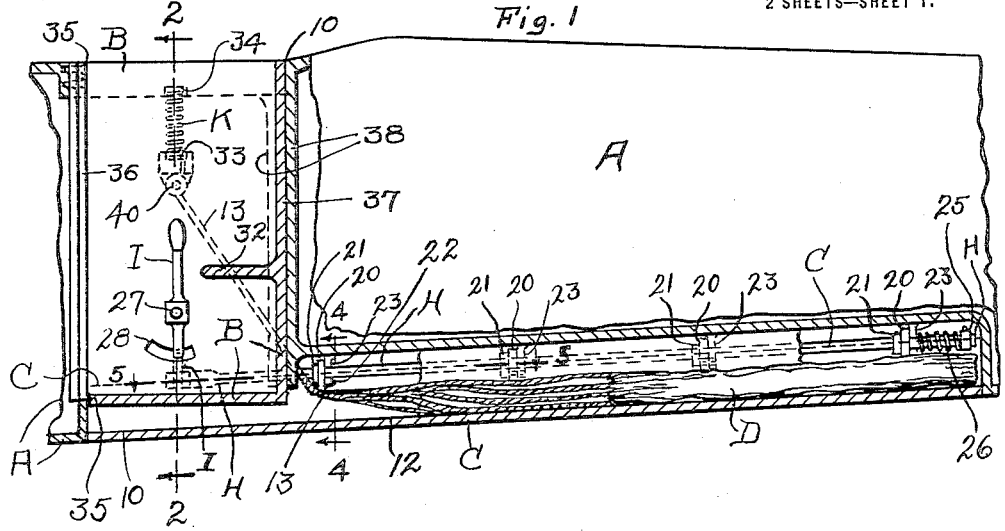
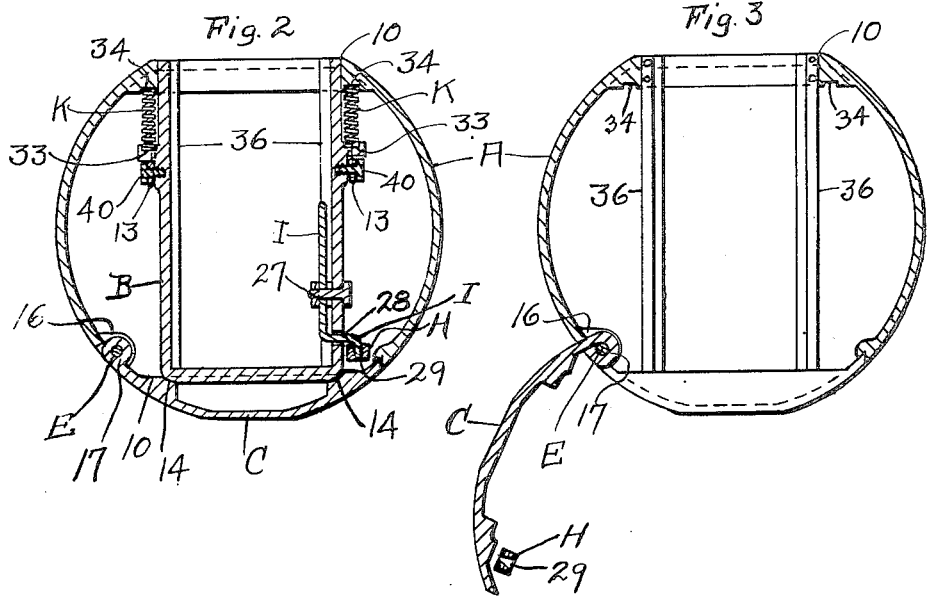
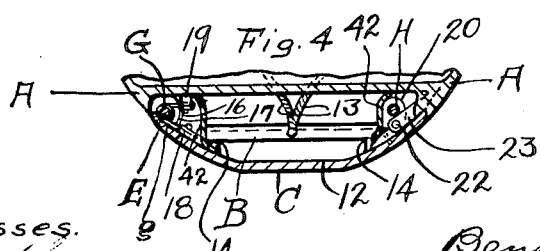
Witnesses.
Inventor.
Benno B. Leustig
By his Attorney.

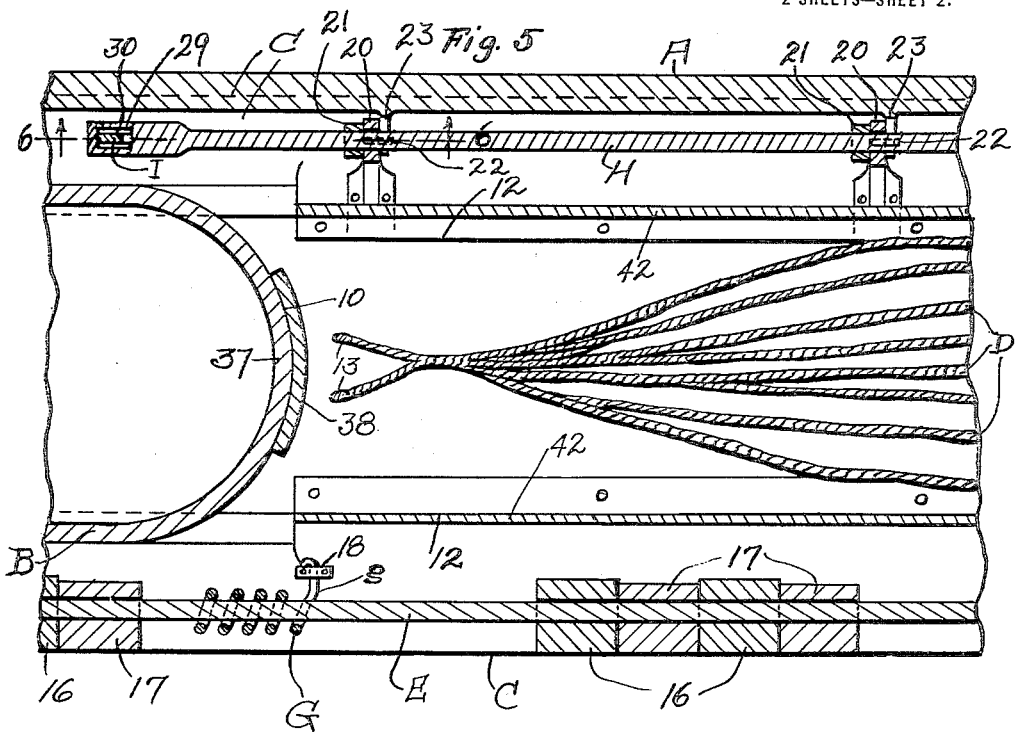
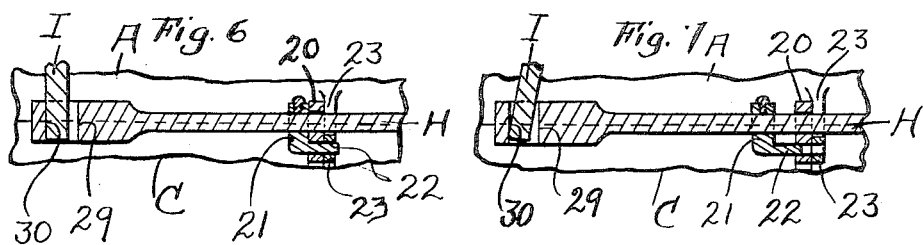

UNITED STATES PATENT OFFICE.

BENNO B. LEUSTIG, OF CLEVELAND, OHIO.

LIFE-PRESERVING APPARATUS FOR AEROPLANES.

1,317,511. Specification of Letters Patent. Patented Sept. 30, 1919.

Application filed October 31, 1918. Serial No. 260,430.

*To all whom it may concern:*

Be it known that I, BENNO B. LEUSTIG, a citizen of the United States, residing at Cleveland, in the county of Cuyahoga and State of Ohio, have invented a new and useful Life-Preserving Apparatus for Aeroplanes, of which the following is a specification.

This invention relates to improvements in life-preserving apparatus for aeroplanes.

The primary object of this invention is to produce apparatus of the character indicated in which a parachute is connected to a seat in the body of the aeroplane and removable with said seat from said body and which comprises means holding said seat in position relative to said body and adapted to be rendered inoperative by an aviator tied to said seat, so that in case the aeroplane becomes disabled from any cause the aviator can save his life by rendering said seat-holding means inoperative to permit movement, from the body of the aeroplane, of said seat which, being heavier than the connected parachute, begins to descend more rapidly than the parachute which is free to open and therefore timely controls the descent of the aviator-carrying seat.

Another object is not only to provide the body of the aeroplane with a movable member serving as a support for said seat, but to lock said seat-supporting member in its operative position by simple and efficient locking means adapted to be rendered inoperative by an occupant of the seat.

Another object is to provide means for insuring the removal of said seat and the connected parachute from the body of the aeroplane upon rendering said locking means inoperative.

Another object is to protect the parachute connected to said seat and to prevent interference with the movement of the parachute with the seat from the body of the aeroplane.

Another object is to render my improved life-preserving apparatus simple in construction and reliable in its operation.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a side view, largely in section, of a portion of an aeroplane body equipped with life-preserving apparatus embodying my invention, and portions are broken away in this figure to more clearly show the construction. Fig. 2 is a transverse vertical section taken along the line 2—2, Fig. 1, looking forwardly. Fig. 3 is a transverse vertical section corresponding with Fig. 2, except that in Fig. 2 a door for carrying the seat for an aviator is shown closed, whereas in Fig. 3 said door is shown open and the aeroplane body is shown without said seat. Fig. 4 is a transverse vertical section taken along the line 4—4, Fig. 1, looking forwardly. Fig. 5 is a longitudinal section taken along the line 5—5, Fig. 1, looking downwardly. Fig. 6 is a vertical section taken along the line 6—6, Fig. 5, looking outwardly. Fig. 7 is a vertical section corresponding with Fig. 6, except that in Fig. 6 the rod employed in locking the aforesaid door in its closed position is shown in its door-locking position, whereas in Fig. 7 said rod is shown as having been actuated into an inoperative position. Figs. 5, 6 and 7 are drawn on a larger scale than Figs. 1, 2, 3 and 4.

Referring to said drawings, A indicates the body of an aeroplane, and 10 indicates a pit or compartment formed in said body for an aviator. Said compartment extends downwardly from the top of the body A and is adapted to discharge downwardly at the bottom of said body. A chair or seat B for carrying an aviator is arranged within and movable downwardly from the compartment 10, and said seat is supported as will hereinafter appear and adapted to be discharged or removed from the body A at the lower or discharging end of said compartment. The body A is provided at its bottom, next rearward of the lower end portion of the compartment 10, with a chamber 12 which is in communication with said compartment and extends longitudinally of said body.

A closure for the lower end of the compartment 10 is provided and shown in the form of a trap-door C extending longitudinally of the body A and having the dimensions and arrangement required to form a bottom for said compartment and a bottom for the chamber 12. (See Fig. 1).

Within the chamber 12 (see Fig. 1) is a parachute D arranged longitudinally of the chamber and resting on and loose relative to the door C. Two ropes 13 (see Figs. 1, 2, 4 and 5) connect the parachute D to opposite sides respectively of the seat B. Said seat is shown resting at its lower end, as at 14 (see Figs. 2 and 4), on the door C, and said door and the connected parachute are free to descend during and upon movement of the door from its closed position shown in Figs. 1 and 2 into its open position shown in Fig. 3. Said door is shown hinged adjacent one longitudinal edge thereof to the aeroplane body A, and the hinge-connection formed between the door and said body (see Figs. 2, 3, 4 and 5) comprises a pivotal rod E arranged at the inner side of the door and longitudinally of said body and loosely embraced by brackets 16 with which said body is provided and loosely embraced by ears 17 with which the door is provided. A torsional spring G is coiled around the rod E and at one end (see Fig. 5) has a terminal member g arranged transversely of an exerting pressure against the inner side of the door C and connected to the door, as at 18. Said spring is attached at its other end, as at 19 (see Fig. 4), to the aeroplane body A and is under tension in the closed position of the door C. It will be observed therefore that said door has its axis arranged longitudinally of the body A adjacent one longitudinal edge of the door, and the door is arranged to swing downwardly in opening, and means locking the door in its closed position are provided adjacent the other longitudinal edge of the door and (see Figs. 1, 4, 5, 6 and 7) comprise an endwise shiftable rod H which is arranged at the inner side of and carried by the door. The rod H is substantially parallel with the pivotal rod E and therefore arranged longitudinally of the door. Preferably the rod H extends loosely through and has bearing in brackets 20 which are secured to the door C in any approved manner and spaced longitudinally of the door. The rod H is shown as provided, forwardly of each bracket 20, with a collar 21 having a rearwardly projecting pin-forming member 22 which is substantially parallel with said rod and, when the door C is closed, as shown in Figs. 1, 4, 5 and 6, extends through said bracket into and is embraced by and removable forwardly from a bracket 23 formed on and internally of the aeroplane body A and participates in locking the door in its closed position. Preferably the rod H extends rearwardly beyond the most rearward bracket 23, as shown in Fig. 1, and is provided at its rear end with a collar 25 between which and said bracket is confined a helical spring 26 mounted on said rod and acting to retain the rod and its pins 22 in their rearward and door-locking position. In said position of the rod H (see Fig. 5) the collars 21 abut against the brackets 20 and coöperate with said brackets in limiting rearward movement of the rod. All that is required to unlock the door C is to shift the rod H forwardly endwise far enough to remove the pins 22 from within the brackets 23. Means for actuating the rod H endwise in a forward direction are provided (see Figs. 1, 2, 5 and 6) and comprise a hand-lever I arranged at the right-hand side of the seat B and fulcrumed horizontally, as at 27, to said seat and extending, below its axis, through a slot 28 in said side of the seat and into a slot 29 extending vertically through and longitudinally of the forward end portion of said rod. The slots 28 and 29 have the arrangement and dimensions required to accommodate the operation of said lever. The slot 29 in the rod H (see Fig. 6) has a rearwardly facing forward end wall 30 against which the lower end portion of said lever abuts in the closed position of the door C. Obviously the actuation of said lever as required to move said portion of the lever forwardly (see Fig. 7) results in a forward endwise movement of the rod H as required to disengage each pin 22 from the adjacent bracket 23 of the aeroplane body and thereby unlock the door. As the seat B rests on the door C and is loose relative to said door and loose relative to said body, said seat and the connected parachute are released from said body upon the actuation of the door into its open position shown in Fig. 3. Gravity will suffice for effecting the descent of the seat B and the connected parachute in a horizontal position of the aeroplane and when the aeroplane, although not in a horizontal position, is more nearly in a horizontal than vertical position, but, in order to insure or facilitate the discharge or movement of said seat from the aeroplane body in inclined positions of the aeroplane upon unlocking the door, resilient means, such, for instance, as two helical springs K are arranged (see Figs. 1 and 2) at opposite sides respectively and externally of said seat and above the seat-proper 32. Each spring K is arranged between an upwardly facing shoulder 33 with which the seat B is externally provided and a downwardly facing shoulder 34 which is formed, above said upwardly facing shoulder, on and internally of the body A. In the closed position of the door C the springs K are under compression and act to eject the seat B downwardly from the compartment A. In a horizontal or approximately horizontal and normal position of the aeroplane the seat B and the door C, upon unlocking the door, will descend from the body A by gravity, and obviously the shoulders 33, the springs K and the shoulders 34 are arranged to prevent separation of said seat from said body should the aeroplane be turned down side up. In any inclined position of the aeroplane, in case the aeroplane has not been turned down side up, the springs K, upon unlocking the door C, force the seat B from the body A, and the door is positively actuated into its open position by the force exerted on said seat by said springs. The relative arrangement of the parts is such that the door C, in its open position, has been swung outwardly and to one side of the seat-dischargeing end of the compartment 10, as shown in Fig. 3, and the spring G acts to retain said door in said position. Fig. 2 shows one point of contact between the seat B and the door C much nearer the axis of the door than the rod H, and the slot 29 in the rod H flares upwardly and is wide enough to insure disengagement of said rod from the lever I without interfering with or being interfered by said lever during movement of the door into its open position. The springs K are preferably attached to the seat B. Preferably the seat B abuts at the forward ends of its bottom and sides, as at 35, Fig. 1, against one or more upright posts or members 36 adapted to serve as a support for an operating board (not shown) to be provided for the aviator who is to occupy said seat. The seat B has a back 37 curved rearwardly in cross-section, as shown in Fig. 5, and embraced by an upright member 38 with which the aeroplane body A is internally provided and which is correspondingly curved in cross-section. The upright members 36 and 38 constitute means for preventing tipping of the seat B relative to the body A preparatory to and during movement of the seat and the connected parachute from said body. The parachute is of any approved type and form which permit a collapsed condition of the parachute, as shown in Fig. 1, when the parachute is not in service, and which facilitate substantially instant expansion of the parachute into an operative condition. Each rope 13, connecting the parachute to the seat B, is attached, as at 40, in any approved manner, to the seat B above the seat-proper 32. The points of attachment of the ropes 13 to the seat B constitute the points of suspension of the seat from the parachute during the descent and operation of the parachute and are such a distance above the seat-proper 32 as to insure the suspension of the seat, during the operation of the parachute, from the parachute above the center of gravity of the seat and aviator who may be occupying the seat, so that the laden seat, should it be discharged or move from the body of the aeroplane in a position uncomfortable to the occupant of the seat, will promptly assume a position comfortable to said occupant upon becoming under the control of the parachute after the movement of the seat and the connected parachute from said body. I would also remark that the side walls of the parachute-containing chamber 12 (see Figs. 4 and 5) are preferably formed by plates 42 carried by and secured to the door C. The plates 42 are arranged between the door-locking means adjacent one side of the chamber 12 and the hinge-connection formed between the door C and the body A so that said hinge-connection and the door-locking means are arranged externally of said chamber, and entanglement of the parachute with the door-locking means and with said hinge-connection is avoided.

What I claim is—

1. The combination, with the body of an aeroplane, a seat arranged in and removable from said body, a parachute connected to and movable with said seat, and a support for said seat and movable to permit movement of said seat and the connected parachute from said body, of means for ejecting said seat from said body upon rendering said support inoperative.

2. The combination, with the body of an aeroplane, a seat arranged in and removable from said body, a parachute connected to and movable with said seat, and a support for said seat and movable to permit movement of said seat and the connected parachute from said body, of resilient means acting to eject said seat from said body upon rendering said support inoperative.

3. The combination, with an aeroplane body having a compartment arranged to discharge at one end at the exterior of said body, a seat arranged in and movable from said compartment at said end of the compartment, and a parachute connected to and movable with the seat, of a closure for said end of said compartment, said closure being locked in its closed position and capable of outward movement, when unlocked, to permit movement of said seat from said compartment, and means acting to effect said outward movement of said closure.

4. The combination, with an aeroplane body having a compartment which extends downwardly from the top of said body and is adapted to discharge downwardly at the bottom of said body, a seat arranged in and removable downwardly from said compartment and provided with upwardly facing shoulders, and a parachute connected to and movable with said seat, of a closure for the lower end of said compartment and movable to permit descent of said seat from said compartment, means locking said closure in its closed position and adapted to be rendered inoperative, and resilient means arranged over and exerting pressure downwardly on the aforesaid shoulders.

5. The combination, with an aeroplane body having a compartment which extends downwardly from the top of said body and is arranged to discharge at the bottom of said body and also having a chamber which is arranged rearward of the lower portion of and in communication with said compartment, a seat arranged in and removable downwardly from said compartment, and a parachute arranged in the aforesaid chamber and connected to and movable with said seat, of a closure for the lower end of and forming a bottom for said compartment and extending rearwardly of said compartment and forming a bottom for the parachute-containing chamber, said closure being locked in its closed position and movable, when unlocked, to permit movement of said seat and the connected parachute from the aeroplane body, and the parachute resting on and being loose relative to said closure.

6. The combination, with an aeroplane body having a compartment which extends downwardly from the top of said body and is adapted to discharge at the bottom of the body and also having a chamber which is arranged externally of and in communication with said compartment, a seat arranged in and removable from said compartment, and a parachute connected to and movable with said seat, of a door forming the bottom of said compartment and also forming the bottom of the aforesaid chamber and supporting the aforesaid seat and the connected parachute, said door being pivotally connected to the aforesaid body adjacent one side of said chamber, and locking means arranged adjacent the opposite side of said chamber and locking the door in its closed position and adapted to be rendered inoperative.

7. The combination, with an aeroplane body having a compartment which extends downwardly from the top of said body and is adapted to discharge at the bottom of the body and also having a chamber which is arranged externally of and in communication with said compartment and extends from said compartment toward one end of said body, a seat arranged in and removable from said compartment, and a parachute connected to and movable with said seat, of a door forming the bottom of said compartment and also forming the bottom of the aforesaid chamber and supporting the aforesaid seat and the connected parachute, a hinge-connection formed between said door and the aforesaid body adjacent one side of said chamber, and locking means adjacent the opposite side of said chamber and locking the door in its closed position and adapted to be rendered inoperative, the side walls of the parachute-containing chamber being formed by plates arranged between said locking means and the aforesaid hinge-connection.

In testimony whereof, I sign the foregoing specification, in the presence of two witnesses.

BENNO B. LEUSTIG.

Witnesses:
CASPER J. DORER,
N. L. MCDONNELL.